United States Patent [19]

Van Deberg

[11] 4,435,116
[45] Mar. 6, 1984

[54] ROBOTIC MANIPULATOR

[76] Inventor: Walter H. Van Deberg, 1829 Kipling Ave., Berkley, Mich. 48072

[21] Appl. No.: 382,706

[22] Filed: May 27, 1982

[51] Int. Cl.³ .............................................. B06C 23/00
[52] U.S. Cl. .................................. 414/728; 74/89.15; 414/718; 414/729
[58] Field of Search ............... 414/729, 730, 732, 733, 414/735, 738, 749, 751, 753, 4, 7, 718, 728; 74/89.15

[56] References Cited

U.S. PATENT DOCUMENTS

| | | | |
|---|---|---|---|
| 3,381,646 | 5/1968 | Ledford | 414/729 |
| 3,651,958 | 3/1972 | Evans et al. | 414/753 X |
| 3,739,923 | 6/1973 | Totsuka | 414/735 |
| 4,199,294 | 4/1980 | Streck et al. | 414/735 X |
| 4,396,344 | 8/1983 | Sugimoto et al. | 414/735 |
| 4,407,625 | 10/1983 | Shum | 414/728 |

FOREIGN PATENT DOCUMENTS 669435  10/1964  Italy ......................................... 414/4

*Primary Examiner*—Robert J. Spar
*Assistant Examiner*—Donald W. Underwood
*Attorney, Agent, or Firm*—Barnes, Kisselle, Raisch, Choate, Whittemore & Hulbert

[57] ABSTRACT

A robotic manipulator includes a main upright frame on which two extensible arms are journalled. One of the arms consists of a pair of laterally spaced lead screws connected together at their front and rear ends and the other consists of a lead screw or sprocket-engaged chain connected to the front connected ends of the two lead screws. The motors for extending and retracting the arms are mounted on the main frame. A tool at the forward connected ends of the arms are controlled by parallelogram linkages which are also powered by motors mounted on the main frame.

22 Claims, 13 Drawing Figures

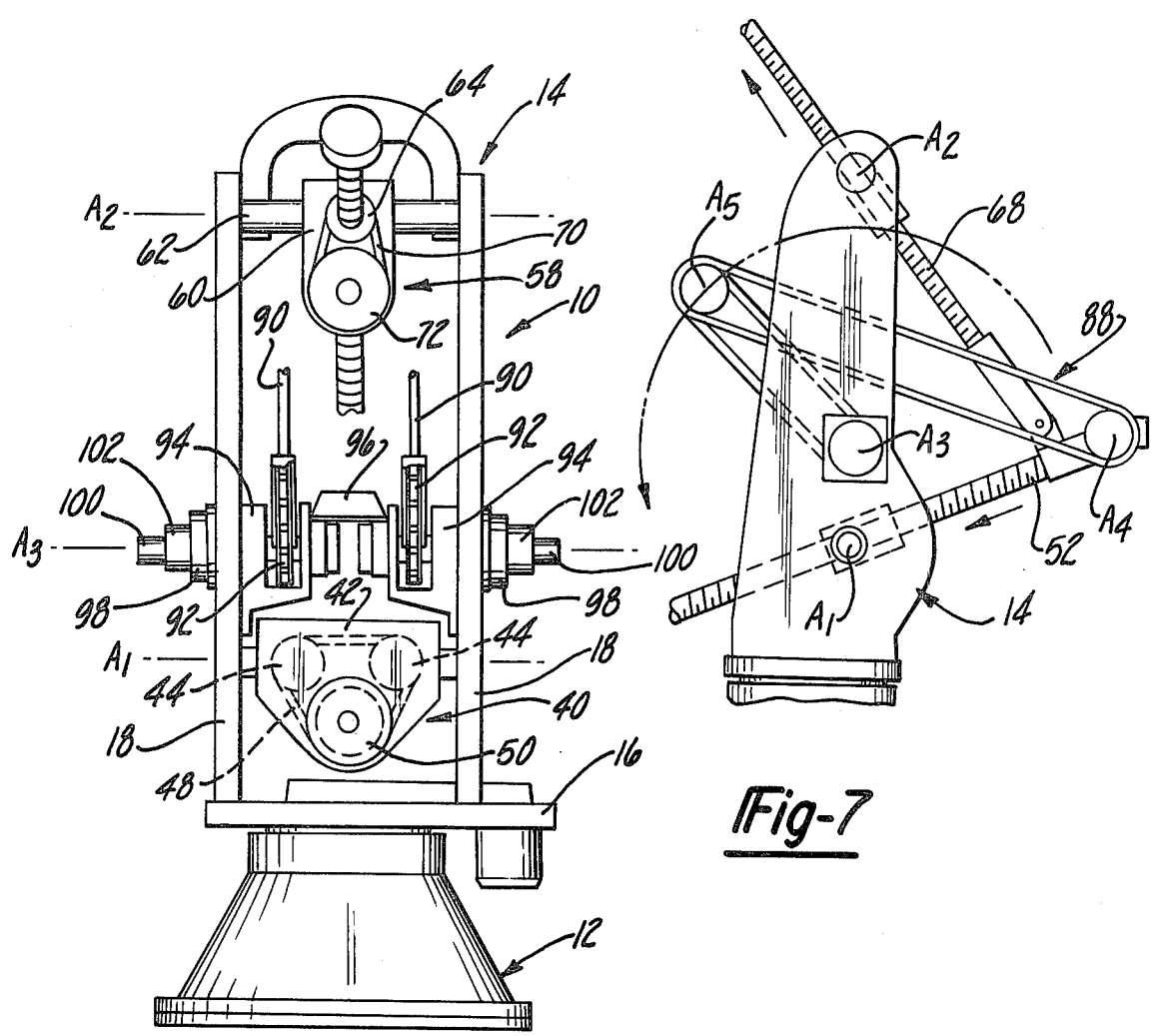
Fig-3
Fig-7
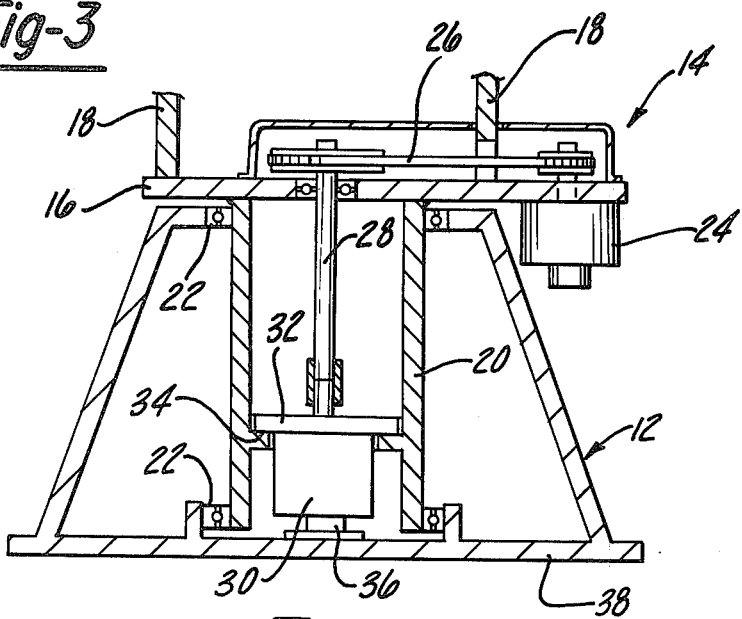
Fig-4

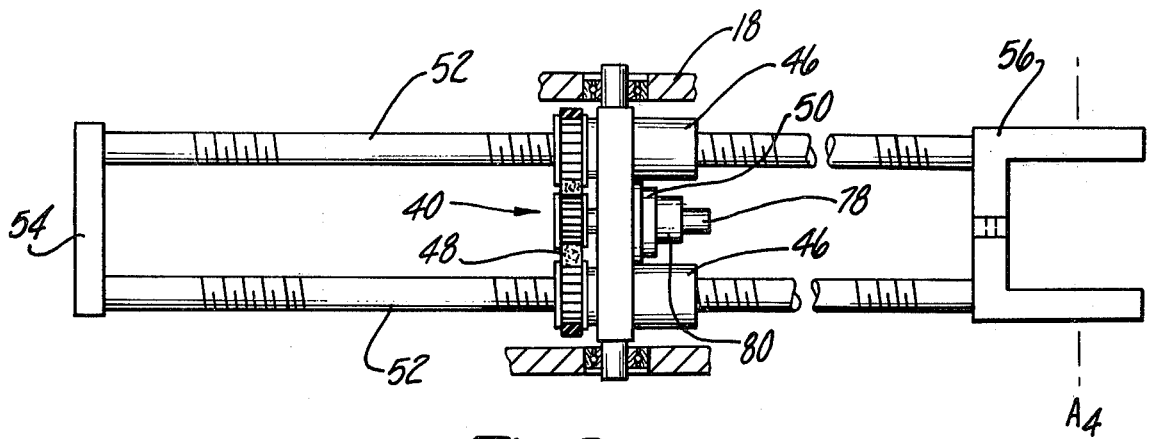
Fig-5
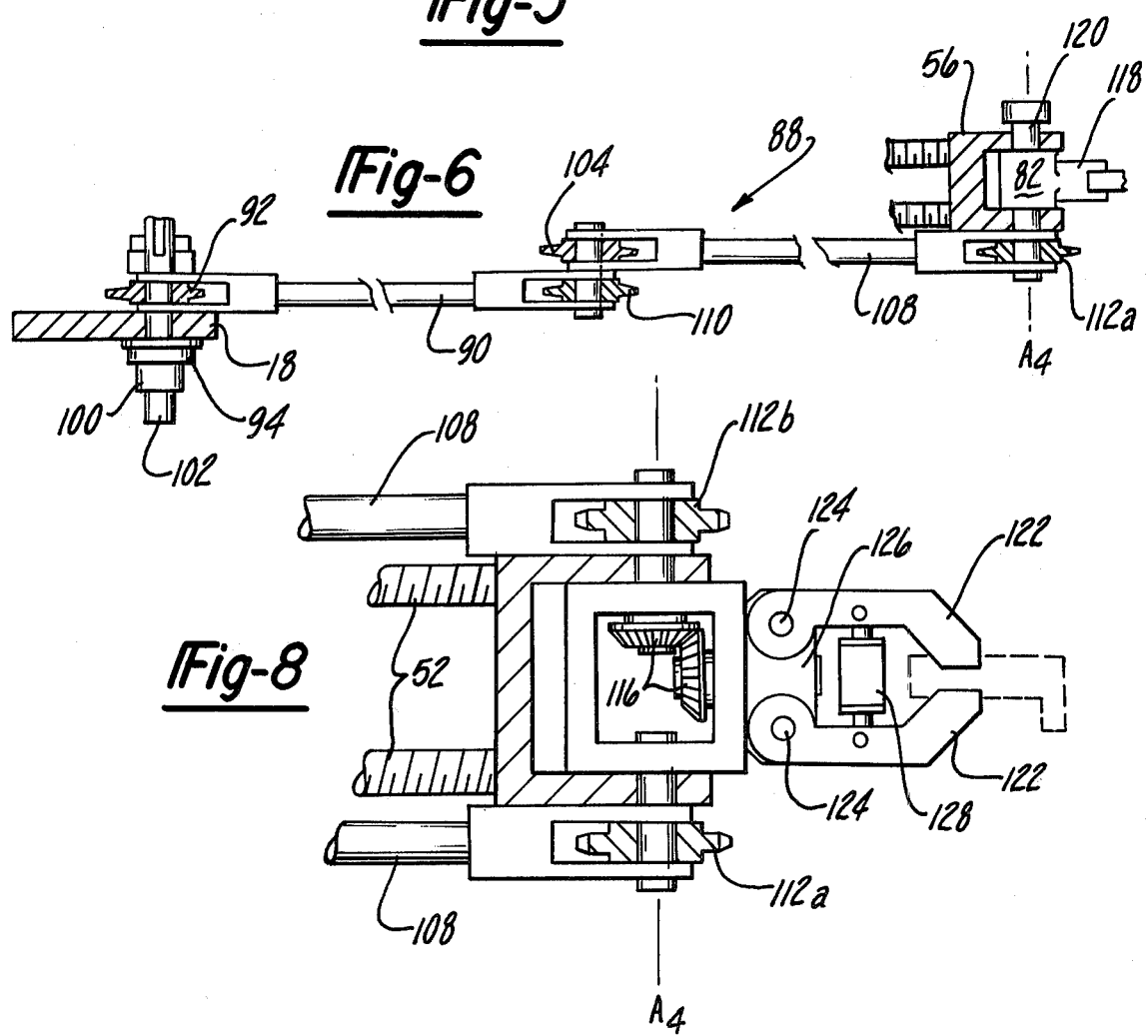
Fig-6
Fig-8

ROBOTIC MANIPULATOR

This invention relates to a robotic manipulator.

Robotic manipulators conventionally include an articulated arm designed to move in a programmed path in space for transporting workpieces between a workpiece conveying machine and a manufacturing or assemblying machine or to manipulate tools to accomplish such manufacturing operations as drilling, welding, paint spraying, etc. A work member, such as a gripper or a tool mounted at the distal or outer end of the arm, is frequently designed to rotate about pitch roll and yaw axes. Such robotic manipulators are usually controlled by a digital computer or a microprocessor which produces signals for controlling the displacement of the tool or work gripper at the end of the manipulator arm in a predetermined path at a controlled velocity.

The arm of a conventional manipulator is normally cantilevered and consists of several interconnected sections individually powered in a manner such as to simulate the normal excursions of a human arm and hand. When the actuator for an arm section or the tool is located at the articulated joint of the component to be actuated, the arm as a whole becomes heavy and bulky. This frequently detracts from the desired actuating speed which, to a large extent, is a function of the inertia of the arm as a whole.

The desirable objectives of most robotic manipulators resides in the displacement of a workpiece or a tool from one position in space to another with a high degree of positional accuracy and with a maximum velocity. These objectives are obtainable only if the manipulator structure as a whole is rigid, but light in weight, and if the means for displacing the arm sections can be controlled with a great accuracy. The mass and rigidity of the arm structure are of extreme importance because of the rotational and transistional moments that are generated and the resultant vibrations and deflections. The positional accuracy likewise depends upon the rigidity and, to a very large extent, on the type of drive train utilized to produce the desired displacements. For example, hydraulic drives, including valves, are normally complicated, lacking in stiffness and smoothness of operation and produce erratic behavior with an abrupt change in loading, such as when a workpiece is deposited and released.

Most manipulators which are truly robotic in nature and presently available on the market are equipped with all of the features and mechanisms required to do any complex task. However, many tasks to be performed are of a relatively simple nature and require only a few of the features and mechanisms built into the manipulator which the purchaser is required to buy. As a result, most robotic manipulators are relatively expensive. This results in an excessive capital expenditure, especially when many manipulators are required.

The primary object of this invention resides in the provision of a robotic manipulator wherein the articulated arm has a relatively low mass and relatively high rigidity in relation to its load carrying capacity.

Another object of the present invention is to provide a drive means for displacing the articulated arm structure between predetermined positions in space to a high degree of accuracy.

A more specific object of the invention is to utilize electric motor-driven lead screws for imparting the necessary motion to the robot arm.

A further object of the invention resides in the provision of a robotic manipulator wherein the driving motors for the articulated arm sections are mounted on the main frame of the machine rather than on the articulated arm.

It is also an object of this invention to provide a robotic manipulator which occupies a relatively small space in relation to the work envelope serviced by the mechanism and in which the components of the mechanism do not interfere with the work envelope.

A still further object of the present invention is to reduce the cost of a robotic manipulator by employing components of modular design which are independently driven and so interrelated that the mechanism can be assembled with only those components required to perform the desired manipulative task. Thus, for simple tasks the manipulator includes only a few basic components and for complex tasks additional components are added to the basic assembly.

The present invention generally comprises a triangular truss disposed in a vertical plane and having one leg or side of fixed dimension and the other two legs of variable length. The leg of fixed dimension comprises an upright support frame. One of the variable length legs comprises a pair of laterally spaced lead screws that are rigidly interconnected at their forward and rearward ends. A pair of electric motor-driven nuts on the support frame are arranged to extend and retract the interconnected screws. The third leg or side of the truss comprises another extensible member, such as another lead screw or a chain or cable connected to the forward ends of the pair of lead screws which is also extended and retracted by a motor-driven actuator on the support frame. The tool or work engaging member is mounted for articulation at the forward ends of the extensible members and is operatively connected with one or more actuating motors, also located on the main support frame. Since all of the driving motors for the manipulator are mounted on the support frame, the mass of the extensible members is reduced to the minimum physical structure required to carry the load. The resulting low inertia allows maximum velocities with a heavy work load capacity. The motors for extending and retracting the extensible members and for actuating the tool or work engaging member communicate with a computer or a microprocessor through encoders and tachometers to precisely control the extent and velocity of movement of each component of the manipulator.

Other objects, features and advantages of the present invention will become apparent from the following description and accompanying drawings, in which:

FIG. 3 is a rear end elevational view of the manipulator;

FIG. 4 is a sectional view along the line 4—4 in FIG. 2;

FIG. 5 is a sectional view generally along the line 5—5 in FIG. 2;

FIG. 6 is a plan view of the mechanism for controlling the pitch of the tool at the end of the manipulator arm;

FIG. 7 is a side elevational view generally illustrating the operation of the extensible members and the mechanism for controlling the actuation of the tool or work gripper;

FIG. 8 is a fragmentary view, partly in section, showing a work gripper supported on the end of the extensible members;

Figure 1:
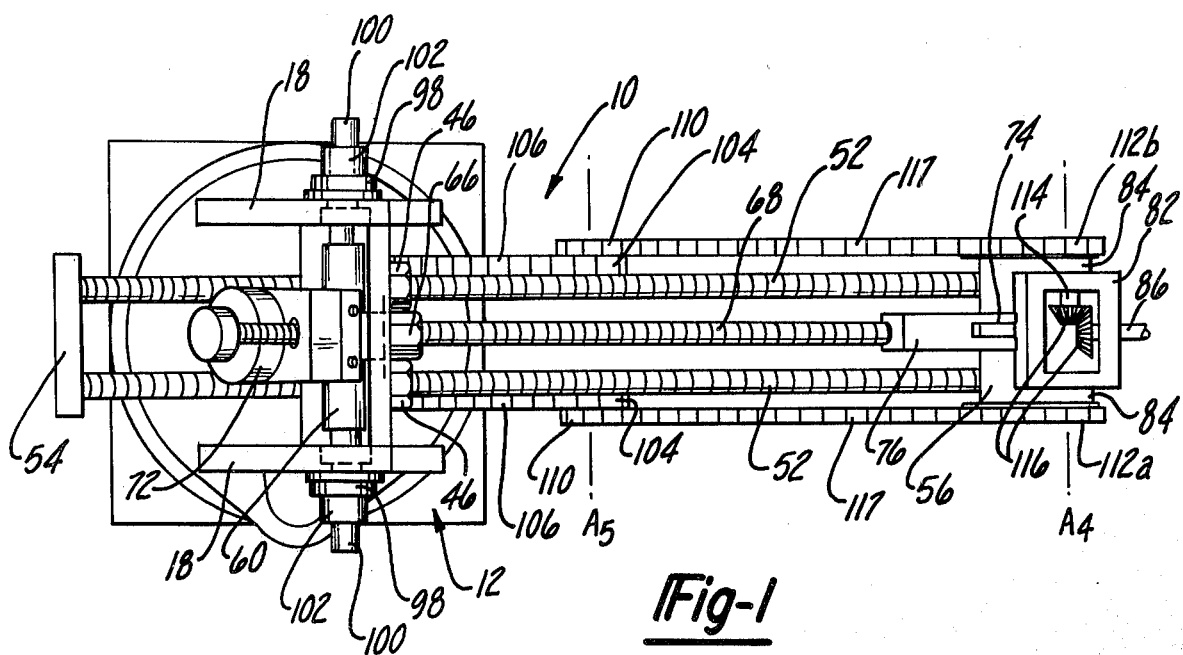
FIG. 1 is a top plan view of a robotic manipulator according to the present invention.

Referring first to FIGS. 1 to 4, the manipulator 10 generally comprises a fixed base 12 on which an upright main frame 14 is supported for rotary movement about a vertical axis. Frame 14 comprises a base plate 16 on which a pair of laterally spaced, upright side frames 18 are rigidly mounted. Support frame 14 is mounted on base 12 by means of a tubular shaft 20 journalled in upper and lower bearings 22 on the base. A motor 24, mounted on the underside of base plate 16, has a belt drive 26 with the input shaft 28 of a gear reducer 30. The mounting flange 32 of reducer 30 is anchored as at 34 to tubular shaft 20 and the output shaft 36 of reducer 30 is anchored to the base plate 38 of base 12. Since the output shaft 36 is fixed to base 12 and cannot rotate, the reaction torque produced by motor 24 is transferred to and will rotate tubular shaft 20 and the main frame 14 supported thereby.

Between the two side frames 18 there is journalled a yoke assembly 40 which is adapted to rock about a horizontal axis $A_1$. Yoke assembly 40 includes a support bracket 42 on which a pair of laterally spaced, rotary spindles 44 are journalled. Each spindle 44 contains a nut 46, preferably of the ball recirculating type. The two nuts are rotated in unison by means of a belt or chain drive 48 with a motor 50 supported on bracket 42. A lead screw 52 extends through each of the nuts 46. Screws 52 are of the same length and are rigidly interconnected together at their rear ends by a spreader bar 54. The forward ends of the two screws 52 are also rigidly interconnected by a U-shaped header 56.

Between the upper ends of side plates 18 there is journalled a second yoke assembly 58 for rotation about a horizontal axis $A_2$. The upper yoke assembly 58 includes a bracket 60 on a shaft 62 journalled at each end in the side plate 18. Bracket 60 supports a spindle 64 which carries a nut 66, preferably of the ball recirculating type, which is engaged with a screw 68. Nut 66 has a belt drive 70 with a motor 72 supported by bracket 60. Screw 68 is disposed in a vertical plane centrally between screws 52 and has its forward end pivotally connected, as at 74, with header 56 by a clevis 76. As shown in FIG. 5, an encoder 78 and a tachometer 80 are directly connected to each of the motors 50 and 72 and communicate with a computer, microprocessor or other suitable control that accurately monitors the speed and rotative position of the output shaft of each motor.

In the embodiment shown in FIGS. 1 to 4 a tool supporting housing 82 is journalled for rotation between the forks 84 of header 56. A suitable tool 86 is journalled at the front face of housing 82. The mechanism for orienting or actuating tool 86 comprises two sets of parallelogram linkages generally designated 88. Each linkage includes a first link 90 rockably supported at one end on a hub of a sprocket 92. Each of the sprockets 92 is journalled for rotation in a bracket 94 mounted on the two side plates 18. The axis of rotation is designated $A_3$. The two brackets 94 are interconnected for rigidity by a bridge plate 96. Each sprocket is driven independently by a motor 98. As is the case with each of the motors previously described, each motor 98 has mounted thereon an encoder 100 and a tachometer 102 communicating with the computer or other control mechanism. The opposite end of each link 90 rotatably supports a second sprocket 104. Endless chains 106 are trained around each set of sprockets 92,104. A second pair of links 108 support sprockets 110 at one end and sprockets 112 at their opposite ends. Sprockets 112 are journalled in the forks 84 of header 56 for rotation about the horizontal axis designated $A_4$. The sprockets 110 are coaxial with sprockets 104 for rotation about the axis designated $A_5$. In the arrangement illustrated in FIGS. 1 to 6 the front sprocket designated 112a is fixed to rotate with housing 82 and the sprocket designated 112b is fixed to a shaft 114 journalled at the axis $A_4$ in housing 82. Shaft 114 is connected to tool 86 by meshing bevel pinions 116. Endless chains 117 are trained around sprockets 110,112.

With the arrangement thus described it will be appreciated that when motor 50 is operated to extend the screws 52, the forward ends of screws 52,68 will swing upwardly around axis $A_2$ and, when motor 50 is operated to retract screws 52, the forward ends of these screws will swing downwardly about axis $A_2$. By the same token, the operation of motor 72 in opposite directions will swing the forward ends of the screws upwardly and downwardly about the axis $A_1$. If both motors 50,72 are operated simultaneously, the forward connected ends of the two screws can be caused to travel any predetermined path within the envelope which is limited by the length of the screws. It will be appreciated, however, that the pivotal movement of screws 52,68 effected by their extension and retraction will affect the operation of the parallelogram linkages 88. For example, if the forward connected ends of the screws are displaced in any manner, the two links 90,108 will pivot relative to each other at the axis $A_5$. If this pivotal movement occurs when neither motor 98 is operating, then the chains 106 will wrap around different arcuate segments of sprockets 92, thus producing rotation of sprockets 104, 110 and 112. This will obviously result in a different orientation of tool 86. The parallelogram linkage is such that housing 82 will retain a fixed pitch orientation relative to frame 14 if the connected forward ends of the two screws are displaced when the motor controlling sprocket 112 is not operated. However, if this occurs and the motor controlling sprocket 112b is not operated, then shaft 114 will rotate and change the roll orientation of tool 86. Thus, by suitably controlling the two motors 98 any desired pitch and roll orientation of tool 86 can be obtained when screws 52,68 are extended and retracted to shaft the position of the forward ends thereof. Furthermore, it will be observed that, if the pitch orientation of housing 82 is controlled by its respective motor 98 so that it remains vertical (rather than horizontal as shown in FIG. 1), then the simultaneous operation of the motor controlling sprocket 112b will determine the yaw of tool 86.

One of the important features of the present invention resides in the relative lengths of the two links 90,108. As a practical matter, link 90 is shorter than link 108 and its pivot axis $A_3$ is located vertically between the axes $A_1$ and $A_2$ such that the distance between axis $A_3$ and $A_5$ is less than the distance between axes $A_2$ and $A_3$. When the links are so proportioned in length and the axis $A_3$ is so located, the pivot axis $A_5$ can swing through the side plates 18 in the manner illustrated in FIG. 7 when the screws 52,68 are retracted to a relatively great extent. Thus, the maximum size of the work envelope is controlled primarily by the length of screws 52,68 and the parallelogram linkage does not interfere with the work envelope.

It will be appreciated that the use of lead screws in the manner illustrated provides a rigid, lightweight structure that can displace the tooling at a relatively high velocity and to a high degree of accuracy. The positional accuracy obtainable with lead screws far exceeds that which is obtainable with hydraulic cylinders. The rigidity of the mechanism results not only from the truss structure, but also from the arrangement of the two screws 52. By rigidly interconnecting screws 52 at their opposite ends a maximum resistance to torsional loads is achieved and deflections are maintained at a minimum.

In FIG. 6 there is illustrated an arrangement wherein a single parallelogram linkage mechanism 88 is utilized. This parallelogram linkage mechanism is substantially the same as that shown in FIGS. 1 to 3 and is employed where there is a need to control only the pitch orientation of the tool. Thus, the tool or work gripper 118 is mounted directly on housing 82 which is in turn fixed to a shaft 120 to which the sprocket 112a is also fixed. Shaft 120 is journalled in header 56 at axis $A_4$. In other respects the single linkage mechanism illustrated in FIG. 6 is the same as that illustrated in FIGS. 1 to 3. It will be appreciated that, if the robotic manipulator is to be employed merely to lift and transport a workpiece from one location to another, there may be no need to orient a work gripper, such as a hook pivotally suspended from header 56. Consequently, with such a simple task to be performed there would be no need whatever to provide either of the parallelogram linkages on the manipulator.

In FIG. 8 a modified form of gripper is illustrated and comprises a pair of jaws 122 pivotally mounted as at 124 on a bracket 126 fixed to the shaft on which pinion 116 is fixed. The jaws are adapted to be opened and closed by any suitable means, such as a small hydraulic cylinder 128. The orientation of jaws 122 is controlled by the same parallelogram linkages 88 illustrated in FIGS. 1 to 3.

Figure 9:
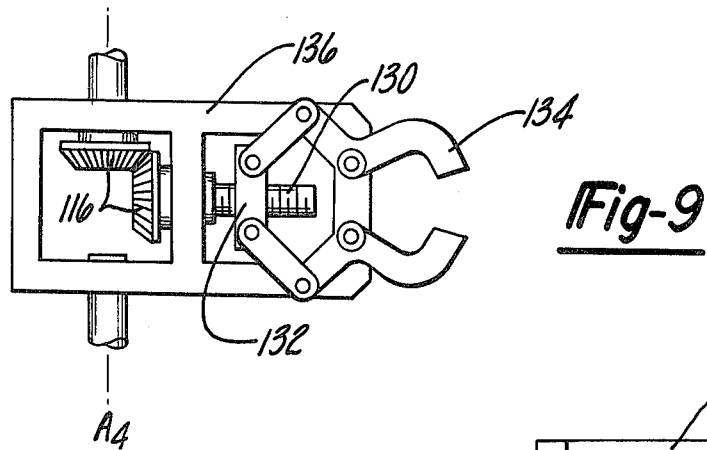
FIG. 9 illustrates a modified form of work gripper.

A further modification of work gripper is illustrated in FIG. 9. In this arrangement the bevel gears 116 operate a screw 130 which, through a nut 132, operates toggle linkage jaws 134. The orientation of housing 136 on which jaws 134 are mounted is controlled in the same manner as the housing 82 previously described.

Figure 11:
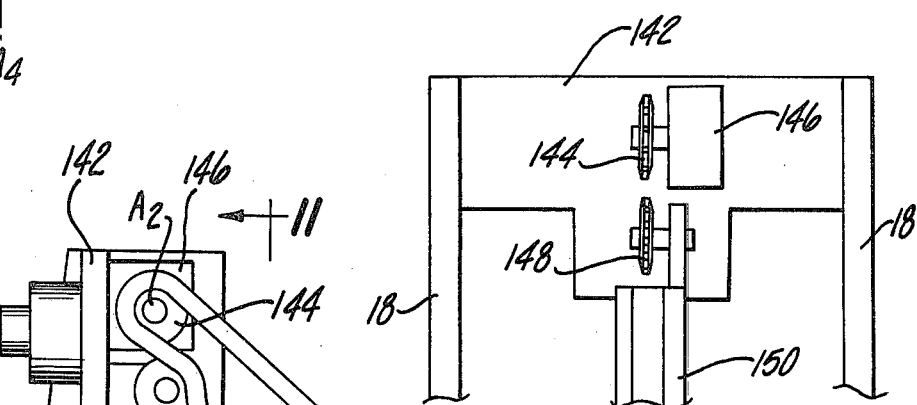
FIG. 11 is a sectional view taken along the line 11—11 in FIG. 10.
Figure 10:
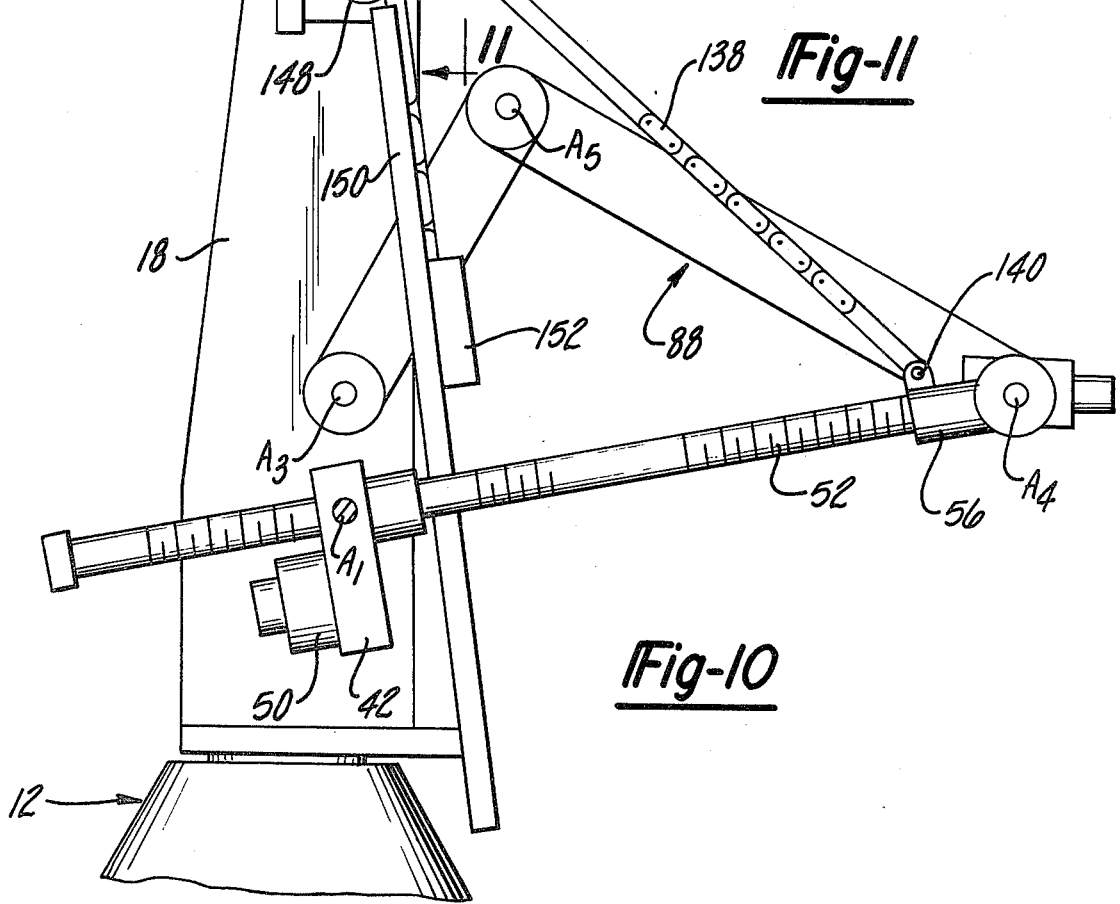
FIG. 10 is a side elevational view of a modified form of manipulator according to the present invention.

In the event that the structure in which the manipulator is used has limited head room which would interfere with the retraction of screw 68 when in an inclined position, the manipulator may be modified in the manner illustrated in FIGS. 10 and 11. The arrangement shown in FIGS. 10 and 11 is substantially the same as that previously described except that the upper screw 68 is replaced by a chain 138 which is connected to the header 56 as at 140. A bracket 142 extends between and is fixedly secured to the upper end portions of side frames 18. Chain 138 extends around a sprocket 144 driven by a motor 146 mounted on bracket 142. The chain also wraps around an idler sprocket 148 to ensure a sufficient wrap around sprocket 144 by chain 138.

Bracket 142 also supports a vertically extending guide 150 which forms a track for a counterweight 152 at the free end of chain 138. Counterweight 152 is sized to balance the tooling at the forward end of screws 52. This greatly reduces the horsepower required. The parallelogram linkage assembly 88 for orienting the tool in the arrangement shown in FIGS. 10 and 11 is the same as that described in connection with FIGS. 1 to 3.

Figure 2:
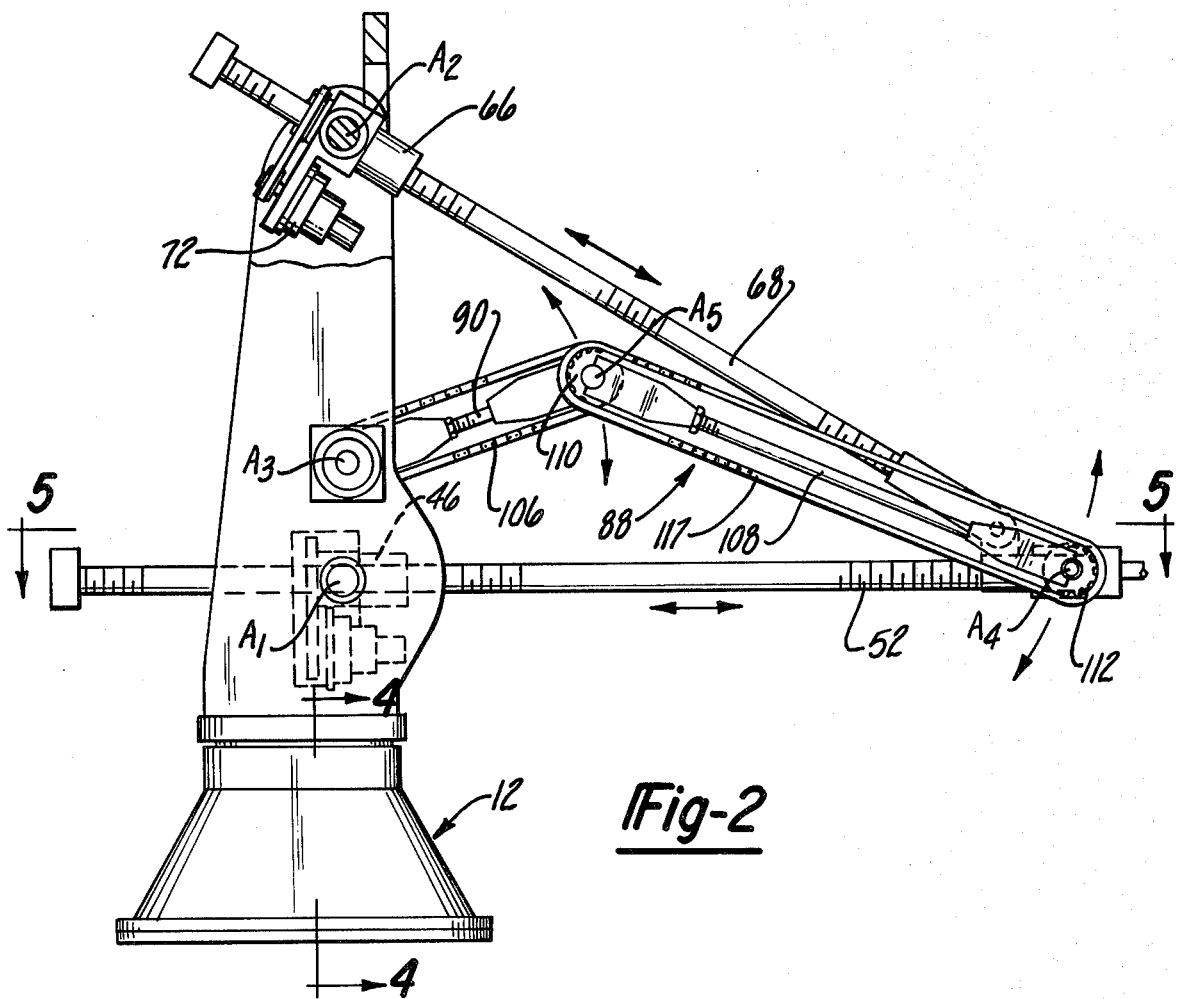
FIG. 2 is a side elevational view, partly in section, of the manipulator illustrated in FIG. 1.
Figure 12:
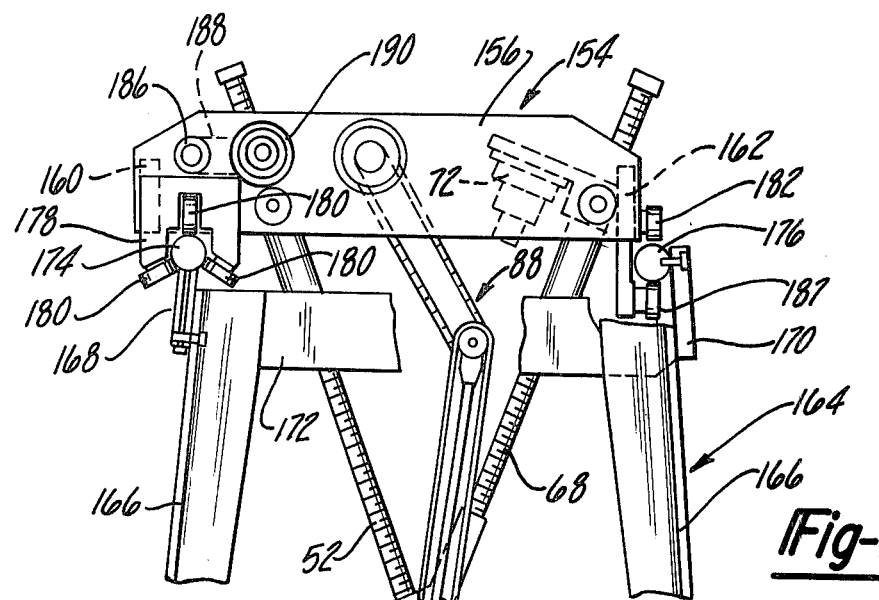
FIG. 12 is a fragmentary side elevational view of another embodiment of robotic manipulator according to the present invention.
Figure 13:
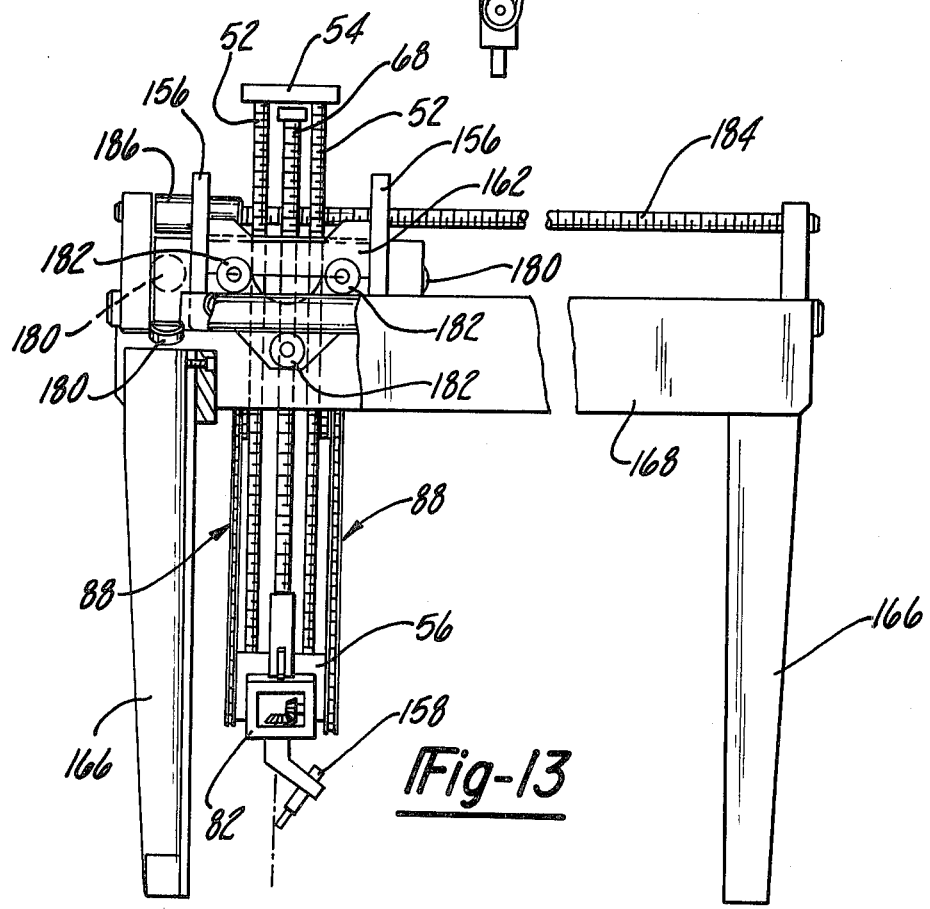
FIG. 13 is an end elevational view of the arrangement shown in FIG. 12.

In the arrangement shown in FIGS. 12 and 13 the robotic manipulator is constructed and operates in generally the same manner as that shown in FIGS. 1 to 3 with the exception, however, that the main frame, instead of being mounted on the base for rotation about a vertical axis, is mounted for movement in a horizontal plane in the manner of a gantry. Thus, the assembly includes a main frame 154 comprising a pair of vertically disposed side frames 156 between which the screws 52,68 are mounted in the same manner as illustrated in connection with the side frames 18 shown in FIGS. 1 to 3. The unit also includes the two sets of parallelogram linkages 88 for controlling the orientation of housing 82 and the tool supported thereon. In this embodiment a tool, designated 158, comprises a welding electrode, the tip of which terminates generally at the roll axis of the tool.

At their opposite ends the two side frames 156 are rigidly interconnected in spaced relation by brackets 160,162. The support structure for the manipulator comprises a frame 164 provided with a pair of upright legs 166 at each end thereof. The legs at each side of the frame are interconnected by longitudinal stringers 168, 170 and at each end by cross pieces 172. A longitudinally extending guide bar 174 is mounted on stringer 168 and a similar guide bar 176 is supported on stringer 170. At one end of frame 154 each side plate 156 has a bracket 178 mounted thereon, each bracket journalling three triangularly oriented rollers 180 which are in close rolling engagement with guide bar 174. At the opposite end of the frame bracket 162 has mounted thereon three rollers 182 lying in a vertical plane and engaging the upper and lower surfaces of guide bar 176. A horizontally disposed lead screw 184 extends lengthwise of frame 164 and is fixedly connected thereto at its opposite ends. A nut 186 is journalled on one of the plates 156. Nut 186 is driven in opposite directions by a belt drive 188 from a motor 190 mounted on the manipulator frame 154. If the floor space of the installation is limited, it is obvious that the guide bars 174,176 can be supported from the roof or ceiling structure of the building, rather than at the upper ends of the legs 166. This manipulator operates in the same manner as that previously described, except that the limits of the work envelope are cubical rather than cylindrical. It will be understood, of course, that the manipulator can be displaced lengthwise of its supporting frame 164 by rotation of nut 186.

I claim:

1. A robotic manipulator comprising a support frame, a pair of laterally spaced, parallel screws rigidly interconnected at their front ends; a rigid support bracket journalled on said frame for rotation about a generally horizontal first axis; a pair of laterally spaced nuts rotatably supported on said bracket in threaded engagement with said screws; drive means on said bracket for rotating said nuts simultaneously at the same rate and in either direction so as to extend and retract the interconnected screws as a unit; a second support bracket journalled on said frame for rotation about a second axis spaced from and parallel to said first axis; a third screw; means pivotally connecting the front end of the third screw with the connected front ends of the first-mentioned screws; a nut journalled on the second bracket in threaded engagement with the third screw; drive means on the second bracket for rotating the last-mentioned nut in either direction to extend and retract the third screw, said two drive means being operable to rotate their respective nuts in relation to each other to displace the interconnected ends of the three screws along a programmed path in a vertical plane, and a work member supported adjacent the connected forward ends of said screws, said frame and said screws defining a vertically disposed, rigid triangular truss having one side of fixed length corresponding to the distance on said frame between said two axes and the two remaining sides being of variable length and connected adjacent said work member.

2. A robotic manipulator as called for in claim 1 wherein said first-mentioned screws are rigidly interconnected by means extending transversely therebetween such that they can be extended and retracted through said nuts substantially throughout their length.

3. A robotic manipulator as called for in claim 2 wherein said support frame comprises a pair of side frames rigidly connected together in horizontally spaced relation and said brackets comprise yokes extending between the side frames and journalled thereon.

4. A robotic manipulator as called for in claim 3 wherein said screws are disposed between the side frames.

5. A robotic manipulator as called for in claim 3 wherein said axes are spaced apart vertically on the side frames.

6. A robotic manipulator as called for in claim 5 wherein the first axis is located below the second axis.

7. A robotic manipulator as called for in claim 6 wherein said support frame is mounted on the base for rotation about a vertical axis.

8. A robotic manipulator as called for in claim 7 including electromechanical means for rotating the support frame on said base.

9. A robotic manipulator as called for in claim 8 wherein said electromechanical means includes an electric motor mounted on said support frame to rotate therewith.

10. A robotic manipulator as called for in claim 1 wherein said drive means for said nuts comprise electromechanical drive means.

11. A robotic manipulator as called for in claim 3 wherein said two axes are spaced apart horizontally and are located above the interconnected ends of the three screws.

12. A robotic manipulator as called for in claim 11 including a support base having a pair of laterally spaced, horizontally extending support rails on which laterally opposed portions of said support frame are mounted and means for moving said support frame horizontally along said rails.

13. A robotic manipulator comprising a support frame; a pair of laterally spaced, parallel screws rigidly interconnected at their front and rear ends in laterally spaced parallel relation; a rigid support bracket journalled on said frame for rotation about a generally horizontal first axis; a pair of laterally spaced nuts rotatably supported on said bracket in threaded engagement with said screws, drive means on said bracket for rotating said nuts simultaneously at the same rate and in either direction so as to extend and retract the interconnected screws as a unit; a work member supported at the connected forward ends of said screws; a flexible tension member anchored at one end to and extending rearwardly and upwardly from the connected forward ends of said screws, a circular member journalled on said frame at a second axis above and parallel to said first axis, said flexible member extending around said circular member; and motor means on said frame connected with said flexible member for lengthening and shortening the portion thereof extending between the circular member and said anchored end.

14. A robotic manipulator as called for in claim 13 wherein said flexible member comprises a chain, said circular member comprises a sprocket and said motor means comprises a motor driving said sprocket.

15. A robotic manipulator as called for in claim 14 wherein said chain has a free end extending downwardly from said sprocket and a counterweight secured to the free end of the chain.

16. A robotic manipulator as called for in claim 1 or 13 wherein the forward ends of the first-mentioned screws are interconnected by a cross head, said work member being mounted on said cross head for rotation about a fixed axis and a parallelogram linkage interconnecting said work member and said frame, said parallelogram linkage comprising a first link means mounted on said frame for pivotal movement about a third axis parallel to said first and second axes, a second link means having one end thereof pivotally connected with said cross head at a fourth axis parallel to said third axis, the other ends of both link means being connected together for relative pivotal movement about a fifth axis parallel to the fourth axis and means interconnecting the frame, said link means and said work member for orienting the work member as the screws are extended and retracted.

17. A robotic manipulator as called for in claim 16 including motor means on said frame for operating said orienting means.

18. A robotic manipulator as called for in claim 17 wherein said parallelogram linkage means includes circular members journalled at each of said third, fourth and fifth axes and endless belt means trained around and in driving engagement with the circular members.

19. A robotic manipulator as called for in claim 18 wherein said circular members comprise sprockets and the endless belt means comprise chains engaging said sprockets.

20. A robotic manipulator as called for in claim 19 wherein said work member comprises a housing journalled on said cross head at said fourth axis and a tool journalled on said housing for rotation about an axis perpendicular to said fourth axis, said parallelogram linkage means comprising two sets of said link means and two sets of said chains and sprockets, one operatively connected to the housing and the other to said tool.

21. A robotic manipulator as called for in claim 20 wherein said motor means comprises two motors on said frame connected one to each of the sprockets at said third axis.

22. A robotic manipulator as called for in claim 1 or 13 wherein said laterally spaced screws are also rigidly interconnected adjacent their rear ends.

* * * * *